United States Patent [19]

Matsumura et al.

[11] Patent Number: 5,739,369
[45] Date of Patent: Apr. 14, 1998

[54] WATER-SOLUBLE SURFACE TREATING AGENTS

[75] Inventors: Kazuyuki Matsumura; Mitsuo Asai; Shoji Ichinohe, all of Usui-gun, Japan

[73] Assignee: Shin-Etsu Chemical Co., Ltd., Tokyo, Japan

[21] Appl. No.: 634,829

[22] Filed: Apr. 19, 1996

[30] Foreign Application Priority Data

Apr. 20, 1995 [JP] Japan ................. 7-119304
Nov. 24, 1995 [JP] Japan ................. 7-329860

[51] Int. Cl.$^6$ ............................... C07F 7/10
[52] U.S. Cl. ................. 556/425; 556/413; 556/418; 556/419; 556/420; 556/423; 556/424; 106/13; 106/54; 106/38.25; 106/38.22; 106/287.11
[58] Field of Search ................... 512/413, 418, 512/419, 420, 423, 424, 425; 106/13, 34, 38.35, 38.22, 287.11

[56] References Cited

U.S. PATENT DOCUMENTS

| | | |
|---|---|---|
| 3,720,644 | 3/1973 | Haszeldine et al. .............. 556/413 X |
| 3,950,588 | 4/1976 | McDougal . |
| 4,094,911 | 6/1978 | Mitsch et al. . |
| 4,647,413 | 3/1987 | Savu ............................. 556/413 X |
| 4,742,177 | 5/1988 | Yamamoto et al. . |
| 5,274,159 | 12/1993 | Pellerite et al. ................. 556/413 X |
| 5,288,889 | 2/1994 | Takago et al. . |

FOREIGN PATENT DOCUMENTS

| | | |
|---|---|---|
| 2149958 | 11/1995 | Canada . |
| 151877 | 12/1984 | European Pat. Off. . |
| 472215 | 8/1991 | European Pat. Off. . |
| 488709 | 6/1992 | European Pat. Off. . |

*Primary Examiner*—Paul F. Shaver
*Attorney, Agent, or Firm*—Millen, White, Zelano, & Branigan, P.C.

[57] ABSTRACT

A surface treating agent comprising a reaction product of (A) a fluoroalkyl group-containing alkoxysilane with (B) an amino group-containing alkoxysilane and optionally further with (C) an alkyl group-containing alkoxysilane is water soluble. The agent is diluted with water to form a solution for treating glass and other substrates to impart durable water repellency and other improved properties to the substrates.

24 Claims, No Drawings

WATER-SOLUBLE SURFACE TREATING AGENTS

BACKGROUND OF THE INVENTION

1. Field of the Invention

This invention relates to a water-soluble surface treating agent for treating substrates of glass, inorganic materials, ceramics, metals, and plastics for imparting thereto water repellent, oil repellent, moisture-proof, stain-proof, anti-icing, lubricant, mold release, weather resistant, and durability properties.

2. Prior Art

The current mainstream surface treating agents for glass to form durably water repellent coatings contain as an active ingredient fluoroalkyl group-containing silanes which are diluted with organic solvents. Agents of the solvent dilution type are full of hazards including fire, explosion, poisoning, and environmental pollution. From the aspects of protection of the global environment and utilization of resources too, there is a strong demand for an organic solvent-free surface treating agent for glass, especially a water-soluble surface treating agent for glass.

Some water-soluble surface treating agents are known in the art. For example, U.S. Pat No. 2,814,572 discloses a glass surface treating agent comprising a water-soluble organosilicon compound. The compound is diluted with water to form a transparent mixture. The agent must be used within one day after dilution since the mixture is poor in shelf stability due to rapid polymerization reaction. Water repellency is low since a long chain alkyl group is the only water repellent component.

SUMMARY OF THE INVENTION

An object of the present invention is to provide a water-soluble surface treating agent which is fully shelf stable and forms a coating having improved properties such as water repellency and durability.

We have found that a reaction product of (A) a fluoroalkyl group-containing alkoxysilane of the general formula (1) and/or a partial hydrolyzate with (B) an amino group-containing alkoxysilane of the general formula (2) and/or a partial hydrolyzate and a reaction product of components (A) and (B) with an alkyl group-containing alkoxysilane of the general formula (3) and/or a partial hydrolyzate, all shown below, are effective as an active ingredient of a surface treating agent. These reaction products are designed so as to impart water solubility to the fluoroalkyl group-containing silane compound which is in itself effective as a water repellent component. Since the reaction products are soluble in water, the surface treating agent of the invention is stable during shelf storage, imparts improved properties such as water repellency, and forms durable coatings. The invention overcomes the problems of the prior art surface treating agents.

Formula (1):

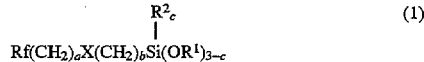
(1)

In formula (1), Rf is $C_nF_{2n+1}$ or a polyfluoroalkyl group represented by

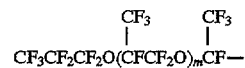

wherein n is an integer of 1 to 20 and m is an integer of at least 1, which may have at least one ether bond, X is at least one linkage group selected from the class consisting of $-CH_2-$, $-CH_2O-$, $-NR^3-$, $-CO_2-$, $-CONR^3-$, $-S-$, $-SO_3-$, and $-SO_2NR^3-$ wherein $R^3$ is a hydrogen atom or alkyl group of 1 to 8 carbon atoms, $R^1$ is an alkyl group having 1 to 4 carbon atoms, $R^2$ is an alkyl group having 1 to 4 carbon atoms, 2 letter a is an integer of 0 to 3, b is an integer of 1 to 3, and c is equal to 0 or 1.

Formula (2):

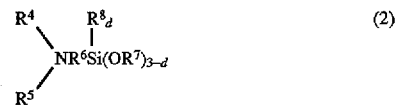
(2)

In formula (2), $R^4$ and $R^5$ are independently selected from the class consisting of a hydrogen atom, alkyl group having 1 to 15 carbon atoms, and aminoalkyl group having 1 to 15 carbon atoms, $R^6$ is a divalent hydrocarbon group having 1 to 18 carbon atoms, $R^7$ is an alkyl group having 1 to 4 carbon atoms, $R^8$ is an alkyl group having 1 to 4 carbon atoms, and letter d is equal to 0 or 1.

Formula (3):

(3)

In formula (3), $R^9$ is a monovalent hydrocarbon group having 1 to 10 carbon atoms, $R^{10}$ is an alkyl group having 1 to 4 carbon atoms, $R^{11}$ is an alkyl group having 1 to 4 carbon atoms, and letter e is equal to 0 or 1.

Therefore, the present invention provides a water-soluble surface treating agent comprising a reaction product of components (A) and (B) or a reaction product of components (A), (B), and (C) and water.

DETAILED DESCRIPTION OF THE INVENTION

The water-soluble surface treating agent of the invention is described in more detail. Component (A) is a fluoroalkyl group-containing alkoxysilane of the general formula (1).

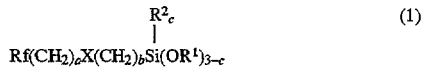
(1)

In formula (1), Rf is $C_nF_{2n+1}$ or a polyfluoroalkyl group represented by

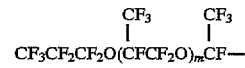

wherein n is an integer of 1 to 20, preferably 1 to 10 and m is an integer of at least 1, preferably 1 to 20, more preferably 1 to 10, which may have at least one ether bond. X is at least one linkage group selected from the class consisting of $-CH_2-$, $-CH_2O-$, $-NR^3-$, $-CO_2-$, $-CONR^3-$, $-S-$, $-SO_3-$, and $-SO_2NR^3-$ wherein $R^3$ is a hydrogen atom or alkyl group of 1 to 8 carbon atoms. Where X is more then one group, they are bonded to form a divalent linkage group. $R^1$ is an alkyl group having 1 to 4 carbon atoms. $R^2$ is an alkyl group having 1 to 4 carbon atoms. Methyl and ethyl are preferred for $R^1$ and $R^2$. Letter a is an integer of 0 to 3, b is an integer of 1 to 3, and c is equal to 0 or 1, preferably 0.

Several illustrative, non-limiting, examples of the fluoroalkyl group-containing alkoxysilane are given below. In the following formulae, Rf is $C_nF_{2n+1}$ wherein n is an integer of 1 to 20, for example, $CF_3-$, $C_2F_5-$, $C_3F_7-$, $C_4F_9-$, $C_6F_{13}-$, $C_8F_{17}-$, $C_{10}F_{21}-$, $C_{12}F_{25}-$, $C_{14}F_{29}-$, $C_{16}F_{33}-$, $C_{18}F_{37}-$, and $C_{20}F_{41}-$.

$Rf(CH_2)_2Si(OCH_3)_3$,
$Rf(CH_2)_2Si(OC_2H_5)_3$,
$Rf(CH_2)_2Si(OCH(CH_3)_2)_3$,
$Rf(CH_2)_2SiCH_3(OCH_3)_2$,
$Rf(CH_2)_2SiCH_3(OC_2H_5)_2$,
$Rf(CH_2)_2SiCH_3(OCH(CH_3)_2)_2$,
$Rf(CH_2)_3Si(OCH_3)_3$,
$Rf(CH_2)_3Si(OC_2H_5)_3$,
$Rf(CH_2)_3Si(OCH(CH_3)_2)_3$,
$Rf(CH_2)_3SiCH_3(OCH_3)_2$,
$Rf(CH_2)_3SiCH_3(OC_2H_5)_2$,
$Rf(CH_2)_3SiCH_3(OCH(CH_3)_2)_2$,
$RfNH(CH_2)_2Si(OCH_3)_3$,
$RfNH(CH_2)_2Si(OC_2H_5)_3$,
$RfNH(CH_2)_2Si(OCH(CH_3)_2)_3$,
$RfNH(CH_2)_2SiCH_3(OCH_3)_2$,
$RfNH(CH_2)_2SiCH_3(OC_2H_5)_2$,
$RfNH(CH_2)_2SiCH_3(OCH(CH_3)_2)_2$,
$RfNH(CH_2)_3Si(OCH_3)_3$,
$RfNH(CH_2)_3Si(OC_2H_5)_3$,
$RfNH(CH_2)_3Si(OCH(CH_3)_2)_3$,
$RfNH(CH_2)_3SiCH_3(OCH_3)_2$,
$RfNH(CH_2)_3SiCH_3(OC_2H_5)_2$,
$RfNH(CH_2)_3SiCH_3(OCH(CH_3)_2)_2$,
$RfNH(CH_2)_2NH(CH_2)_2Si(OCH_3)_3$
$RfNH(CH_2)_2NH(CH_2)_2Si(OC_2H_5)_3$,
$RfNH(CH_2)_2NH(CH_2)_2Si(OCH(CH_3)_2)_3$,
$RfNH(CH_2)_2NH(CH_2)_2SiCH_3(OCH_3)_2$,
$RfNH(CH_2)_2NH(CH_2)_2SiCH_3(OC_2H_5)_2$,
$RfNH(CH_2)_2NH(CH_2)_2SiCH_3(OCH(CH_3)_2)_2$,
$RfNH(CH_2)_2NH(CH_2)_3Si(OCH_3)_3$,
$RfNH(CH_2)_2NH(CH_2)_3Si(OC_2H_5)_3$,
$RfNH(CH_2)_2NH(CH_2)_3Si(OCH(CH_3)_2)_3$,
$RfNH(CH_2)_2NH(CH_2)_3SiCH_3(OCH_3)_2$,
$RfNH(CH_2)_2NH(CH_2)_3SiCH_3(OC_2H_5)_2$,
$RfNH(CH_2)_2NH(CH_2)_3SiCH_3(OCH(CH_3)_2)_2$,
$RfCONH(CH_2)_2Si(OCH_3)_3$,
$RfCONH(CH_2)_2Si(OC_2H_5)_3$,
$RfCONH(CH_2)_2Si(OCH(CH_3)_2)_3$,
$RfCONH(CH_2)_2SiCH_3(OCH_3)_2$,
$RfCONH(CH_2)_2SiCH_3(OC_2H_5)_2$,
$RfCONH(CH_2)_2SiCH_3(OCH(CH_3)_2)_2$,
$RfCONH(CH_2)_3Si(OCH_3)_3$,
$RfCONH(CH_2)_3Si(OC_2H_5)_3$,
$RfCONH(CH_2)_3Si(OCH(CH_3)_2)_3$,
$RfCONH(CH_2)_3SiCH_3(OCH_3)_2$,
$RfCONH(CH_2)_3SiCH_3(OC_2H_5)_2$,
$RfCONH(CH_2)_3SiCH_3(OCH(CH_3)_2)_2$,
$Rf(CH_2)_2OCONH(CH_2)_2Si(CH_3)_3$,
$Rf(CH_2)_2OCONH(CH_2)_2Si(OC_2H_5)_3$,
$Rf(CH_2)_2OCONH(CH_2)_2Si(OCH(CH_3)_2)_3$,
$Rf(CH_2)_2OCONH(CH_2)_2SiCH_3(OCH_3)_2$,
$Rf(CH_2)_2OCONH(CH_2)_2SiCH_3(OC_2H_5)_2$,
$Rf(CH_2)_2OCONH(CH_2)_2SiCH_3(OCH(CH_3)_2)_2$,
$Rf(CH_2)_2OCONH(CH_2)_3Si(OCH_3)_3$,
$Rf(CH_2)_2OCONH(CH_2)_3Si(OC_2H_5)_3$,
$Rf(CH_2)_2OCONH(CH_2)_3Si(OCH(CH_3)_2)_3$,
$Rf(CH_2)_2OCONH(CH_2)_3SiCH_3(OCH_3)_2$,
$Rf(CH_2)_2OCONH(CH_2)_3SiCH_3(OC_2H_5)_2$,
$Rf(CH_2)_2OCONH(CH_2)_3SiCH_3(OCH(CH_3)_2)_2$,
$RfSO_2NH(CH_2)_2Si(CH_3)_3$,
$RfSO_2NH(CH_2)_2Si(OC_2H_5)_3$,
$RfSO_2NH(CH_2)_2Si(OCH(CH_3)_2)_3$,
$RfSO_2NH(CH_2)_2SiCH_3(OCH_3)_2$,
$RfSO_2NH(CH_2)_2SiCH_3(OC_2H_5)_2$,
$RfSO_2NH(CH_2)_2SiCH_3(OCH(CH_3)_2)_2$,
$RfSO_2NH(CH_2)_3Si(OCH_3)_3$,
$RfSO_2NH(CH_2)_3Si(OC_2H_5)_3$,
$RfSO_2NH(CH_2)_3Si(OCH(CH_3)_2)_3$,
$RfSO_2NH(CH_2)_3SiCH_3(OCH_3)_2$,
$RfSO_2NH(CH_2)_3SiCH_3(OC_2H_5)_2$,
$RfSO_2NH(CH_2)_3SiCH_3(OCH(CH_3)_2)_2$,
$RfSO_2N(CH_3)(CH_2)_2Si(OCH_3)_3$,
$RfSO_2N(CH_3)(CH_2)_2Si(OC_2H_5)_3$,
$RfSO_2N(CH_3)(CH_2)_2Si(OCH(CH_3)_2)_3$,
$RfSO_2N(CH_3)(CH_2)_2SiCH_3(OCH_3)_2$,
$RfSO_2N(CH_3)(CH_2)_2SiCH_3(OC_2H_5)_2$,
$RfSO_2N(CH_3)(CH_2)_2SiCH_3(OCH(CH_3)_2)_2$,
$RfSO_2N(CH_3)(CH_2)_3Si(OCH_3)_3$,
$RfSO_2N(CH_3)(CH_2)_3Si(OC_2H_5)_3$,
$RfSO_2N(CH_3)(CH_2)_3Si(OCH(CH_3)_2)_3$,
$RfSO_2N(CH_3)(CH_2)_3SiCH_3(OCH_3)_2$,
$RfSO_2N(CH_3)(CH_2)_3SiCH_3(OC_2H_5)_2$,
$RfSO_2N(CH_3)(CH_2)_3SiCH_3(OCH(CH_3)_2)_2$,
$RfSO_2NH(CH_2)_2CONH(CH_2)_3Si(OCH_3)_3$,
$RfSO_2NH(CH_2)_2CONH(CH_2)_3Si(OC_2H_5)_3$,
$RfSO_2NH(CH_2)_2CONH(CH_2)_3Si(OCH(CH_3)_2)_3$,
$RfSO_2NH(CH_2)_2CONH(CH_2)_3SiCH_3(OCH_3)_2$,
$RfSO_2NH(CH_2)_2CONH(CH_2)_3SiCH_3(OCH_2H_5)_2$,
$RfSO_2NH(CH_2)_2CONH(CH_2)_3SiCH_3(OCH(CH_3)_2)_2$,
$RfSO_2NH(CH_2)_2CONH(CH_2)_3Si(OCH_3)_3$,
$RfSO_2NH(CH_2)_2CONH(CH_2)_3Si(OC_2H_5)_3$,
$RfSO_2NH(CH_2)_2CONH(CH_2)_3Si(OCH(CH_3)_2)_3$,
$RfSO_2NH(CH_2)_2CONH(CH_2)_3SiCH_3(OCH_3)_2$,
$RfSO_2NH(CH_2)_2CONH(CH_2)_3SiCH_3(OC_2H_5)_2$,
$RfSO_2NH(CH_2)_2CONH(CH_2)_3SiCH_3(OCH(CH_3)_2)_2$, $$CF_3CF_2CF_2O(\underset{\underset{CF_3}{|}}{C}FCF_2O)_m\underset{\underset{CF_3}{|}}{C}FCONH(CH_2)_3Si(OCH_3)_3,$$

-continued

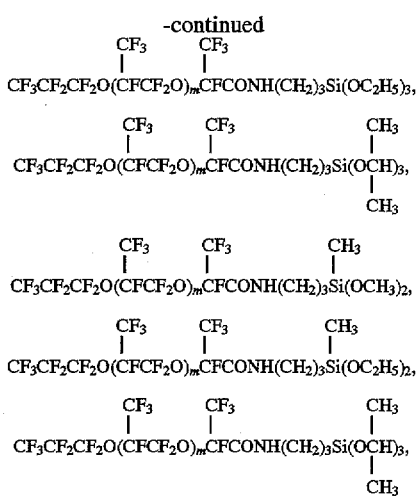

Preferred among these are the following groups.
C$_8$F$_{17}$C$_2$H$_4$Si(OCH$_3$)$_3$,
C$_8$F$_{17}$C$_2$H$_4$Si(OC$_2$H$_5$)$_3$,
C$_8$F$_{17}$CONHC$_2$H$_4$Si)OCH$_3$)$_3$ and

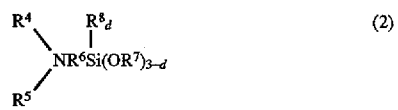

with the first-mentioned one being most preferred.

In the practice of the invention, not only the silane of formula (1), but also a partial hydrolyzate of the silane are useful as component (A) while a mixture of a silane and a partial hydrolyzate is also acceptable. The partial hydrolyzate should have at least one hydrolyzable group left therein. A mixture of silanes and a mixture of partially hydrolyzed silanes may also be used if desired.

Component (B) is an amino group-containing alkoxysilane of the general formula (2).

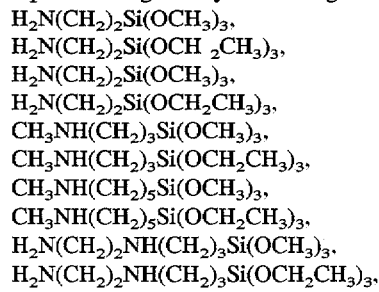

In formula (2), each of R$^4$ and R$^5$, which may be identical or different, is a hydrogen atom, alkyl group having 1 to 15 carbon atoms, preferably 1 to 4 carbon atoms or aminoalkyl group having 1 to 15 carbon atoms, preferably 1 to 6 carbon atoms. R$^6$ is a divalent hydrocarbon group having 1 to 18 carbon atoms, preferably 1 to 6 carbon atoms, such as alkylene, arylene, and alkylarylene groups. R$^7$ is an alkyl group having 1 to 4 carbon atoms. R$^8$ is an alkyl group having 1 to 4 carbon atoms. Letter d is equal to 0 or 1.

Several illustrative, non-limiting, examples of the amino group-containing alkoxysilane are given below.

H$_2$N(CH$_2$)$_2$Si(OCH$_3$)$_3$,
H$_2$N(CH$_2$)$_2$Si(OCH$_2$CH$_3$)$_3$,
H$_2$N(CH$_2$)$_2$Si(OCH$_3$)$_3$,
H$_2$N(CH$_2$)$_2$Si(OCH$_2$CH$_3$)$_3$,
CH$_3$NH(CH$_2$)$_3$Si(OCH$_3$)$_3$,
CH$_3$NH(CH$_2$)$_3$Si(OCH$_2$CH$_3$)$_3$,
CH$_3$NH(CH$_2$)$_5$Si(OCH$_3$)$_3$,
CH$_3$NH(CH$_2$)$_5$Si(OCH$_2$CH$_3$)$_3$,
H$_2$N(CH$_2$)$_2$NH(CH$_2$)$_3$Si(OCH$_3$)$_3$,
H$_2$N(CH$_2$)$_2$NH(CH$_2$)$_3$Si(OCH$_2$CH$_3$)$_3$,
CH$_3$NH(CH$_2$)$_2$NH(CH$_2$)$_3$Si(OCH$_3$)$_3$,
CH$_3$NH(CH$_2$)$_2$NH(CH$_2$)$_3$Si(OCH$_2$CH$_3$)$_3$,
C$_4$H$_9$NH(CH$_2$)$_2$NH(CH:$_2$)$_3$Si(OCH$_3$)$_3$,
C$_4$H$_9$NH(CH$_2$)$_2$NH(CH:$_2$)$_3$Si(OCH$_2$CH$_3$)$_3$,
H$_2$N(CH$_2$)$_2$SiCH$_3$(OCH$_3$)$_2$,
H$_2$N(CH$_2$)$_2$SiCH$_3$(OCH$_2$CH$_3$)$_2$,
H$_2$N(CH$_2$)$_3$SiCH$_3$(OCH$_3$)$_2$,
H$_2$N(CH$_2$)$_3$SiCH$_3$(OCH$_2$CH$_3$)$_2$,
CH$_3$NH(CH$_2$)$_3$SiCH$_3$(OCH$_3$)$_2$,
CH$_3$NH(CH$_2$)$_3$SiCH$_3$(OCH$_2$CH$_3$)$_2$,
CH$_3$NH(CH$_2$)$_5$SiCH$_3$(OCH$_3$)$_2$
CH$_3$NH(CH$_2$)$_5$SiCH$_3$(OCH$_2$CH$_3$)$_2$,
H$_2$N(CH$_2$)$_2$NH(CH$_2$)$_3$SiCH$_3$(OCH$_3$)$_2$,
H$_2$N(CH$_2$)$_2$NH(CH$_2$)$_3$SiCH$_3$(OCH$_2$CH$_3$)$_2$,
CH$_3$NH(CH$_2$)$_2$NH(CH$_2$)$_3$SiCH$_3$(OCH$_3$)$_2$,
CH$_3$NH(CH$_2$)$_2$NH(CH$_2$)$_3$SiCH$_3$(OCH$_2$CH$_3$)$_2$,
C$_4$H$_9$NH(CH$_2$)$_2$NH(CH$_2$)$_3$SiCH$_3$(OCH$_3$)$_2$,
C$_4$H$_9$NH(CH$_2$)$_2$NH(CH$_2$)$_3$SiCH$_3$(OCH$_2$CH$_3$)$_2$

Preferred among these are N-(2-aminoethyl)-3-aminopropyltrimethoxysilane, N-(2-aminoethyl)-3-aminopropylmethyldimethoxysilane, and 3-aminopropyltrimethoxysilane.

In the practice of the invention, not only the silane of formula (2), but also a partial hydrolyzate of the silane are useful as component (B).

The water-soluble surface treating agent according to the first aspect contains a reaction product of components (A) and (B) as a main ingredient, which is dissolved in water. The reaction product is obtained by effecting co-hydrolysis and condensation of components (A) and (B) in the presence of organic or inorganic acids. It is preferred from the stability point of view to produce the reaction product by first effecting partial hydrolysis of component (A) in the presence of an organic or inorganic acid and then reacting the partially hydrolyzed component (A) with component (B).

Examples of the organic or inorganic acid used in hydrolysis of component (A) include hydrochloric acid, sulfuric acid, methanesulfonic acid, formic acid, acetic acid, propionic acid, citric acid, oxalic acid, and maleic acid alone or in admixture, with acetic acid and propionic acid being preferred. The acid is preferably used in an amount of about 5 to 400 parts by weight, more preferably about 15 to 350 parts by weight per 100 parts by weight of component (A). With less than 5 parts of the acid, the progress of hydrolysis would be retarded and the agent in aqueous solution form would be less stable. Most preferably the acid catalyst is added in such an amount that when the reaction product is dissolved in water, the resulting aqueous system may be adjusted at pH 7.0 to 3.0.

Upon hydrolysis, the reactant is preferably diluted with a solvent. The solvents used herein are preferably alcohol solvents including methanol, ethanol, 1-propanol, 2-propanol, 1-butanol, 2-butanol, and 3-butanol, with the 3-butanol being most preferred. The solvent is preferably used in an amount of about 100 to 500 parts by weight, more preferably about 200 to 400 parts by weight per 100 parts by weight of component (A). Less than 100 parts of the solvent would allow condensation to take place whereas more than 500 parts of the solvent would undesirably retard hydrolysis.

For hydrolysis, water is preferably added to component (A) in an amount of about 1.0 to 3.0 mol, more preferably 1.2 to 2.5 mol per mol of component (A). Less than 1.0 mol of water would leave many alkoxy groups whereas more than 3.0 mol of water would promote condensation. Preferred reaction conditions include a reaction temperature of 10° to 100° C., preferably 60° to 90° C. and a reaction time of about 1 to 3 hours.

The thus hydrolyzed component (A) is then successively reacted with component (B). The molar ratio of components (B) and (A) is preferably from 0.5:1.0 to 20.0:1.0. With a molar ratio of (B)/(A) of less than 0.5/1, water solubility would be low. With a molar ratio of (B)/(A) of more than 20.0/1, water repellency would be low. As to conditions for the reaction of component (B), a reaction temperature of 60 to 100° C. and a reaction time of about 1 to 3 hours are preferred.

The water-soluble surface treating agent according to the second aspect contains a reaction product of the above-mentioned components (A) and (B) and the following component (C) as a main ingredient, which is dissolved in water.

Component (C) is an alkyl group-containing alkoxysilane of the general formula (3).

$$R^9Si(OR^{11})_{3-e}\overset{R^{10}_e}{|}\quad (3)$$

In formula (3), $R^9$ is a monovalent hydrocarbon group having 1 to 10 carbon atoms, $R^{10}$ is an alkyl group having 1 to 4 carbon atoms, $R^{11}$ is an alkyl group having 1 to 4 carbon atoms, and letter e is equal to 0 or 1. Examples of the monovalent hydrocarbon group include alkyl, alkenyl, aryl, and aralkyl groups and halogen substituted ones thereof, with the alkyl groups being preferred.

Several illustrative, non-limiting, examples of the alkyl group-containing alkoxysilane are given below.

$C_{10}H_{21}Si(OCH_3)_3$,
$C_{10}H_{21}Si(OC_2H_5)_3$,
$C_{10}H_{21}Si(OCH(CH_3)_2)_3$,
$C_{10}H_{21}Si(CH_3)(OCH_3)_2$,
$C_{10}H_{21}Si(CH_3(OC_2H_5)_2$,
$C_{10}H_{21}Si(CH_3)(OCH(CH_3)_2)_2$,
$C_8H_{17}Si(OCH_3)_3$,
$C_8H_{17}Si(OC_2H_5)_3$,
$C_8H_{17}Si(OCH(CH_3)_2)_3$,
$C_8H_{17}Si(CH_3)(OCH_3)_2$,
$C_8H_{17}Si(CH_3)(OC_2H_5)_2$,
$C_8H_{17}Si(CH_3)(OCH(CH_3)_2)_2$,
$C_6H_{13}Si(OCH_3)_3$,
$C_6H_{13}Si(OC_2H_5)_3$,
$C_6H_{13}Si(OCH(CH_3)_2)_3$,
$C_6H_{13}Si(CH_3)(OCH_3)_2$,
$C_6H_{13}Si(CH_3)(OC_2H_5)_2$,
$C_6H_{13}Si(CH_3)(OCH(CH_3)_2)_2$,
$C_4H_9Si(OCH_3)_3$,
$C_4H_9Si(OC_2H_5)_3$,
$C_4H_9Si(OCH(CH_3)_2)_3$,
$C_4H_9Si(CH_3)(OCH_3)_2$,
$C_4H_9Si(CH_3)(OC_2H_5)_2$,
$C_4H_9Si(CH_3)(OCH(CH_3)_2)_2$,
$C_3H_7Si(OCH_3)_3$,
$C_3H_7Si(OC_2H_5)_3$,
$C_3H_7Si(OCH(CH_3)_2)_3$,
$C_3H_7Si(CH_3)(OCH_3)_2$,
$C_3H_7Si(CH_3)(OC_2H_5)_2$,
$C_3H_7Si(CH_3)(OCH(CH_3)_2)_2$,
$C_2H_5Si(OCH_3)_3$,
$C_2H_5Si(OC_2H_5)_3$,
$C_2H_5Si(OCH(CH_3)_2)_3$,
$C_2H_5Si(CH_3)(OCH_3)_2$,
$C_2H_5Si(CH_3)(OC_2H_5)_2$,
$C_2H_5Si(CH_3)(OCH(CH_3)_2)_2$,
$CH_3Si(OCH_3)_3$,
$CH_3Si(OC_2H_5)_3$,
$CH_3Si(OCH(CH_3)_2)_3$,
$(CH_3)_2Si(OCH_3)_2$,
$(CH_3)_2Si(OC_2H_5)_2$,
$(CH_3)_2Si(OCH(CH_3)_2)_2$

Preferred among these are $C_{10}H_{21}Si(OCH_3)_3$, $C_{10}H_{21}Si(CH_3)(OCH_3)_2$, $(CH_3)_2Si(OCH_3)_2$, and $(CH_3)_2Si(OC_2H_5)_2$.

In the practice of the invention, not only the silane of formula (3), but also a partial hydrolyzate of the silane are useful as component (C).

The reaction product of components (A), (B) and (C) is obtained by effecting co-hydrolysis and condensation of components (A), (B) and (C) in the presence of organic or inorganic acids. It is preferred from the stability point of view to produce the reaction product by first effecting partial hydrolysis of components (A) and (C) in the presence of an organic or inorganic acid and then reacting the partially hydrolyzed components (A) and (C) with component (B).

Examples of the organic or inorganic acid used in hydrolysis of components (A) and (C) include hydrochloric acid, sulfuric acid, methanesulfonic acid, formic acid, acetic acid, propionic acid, citric acid, oxalic acid, and maleic acid alone or in admixture, with acetic acid and propionic acid being preferred. The acid is preferably used in an amount of about 30 to 400 parts by weight, more preferably about 40 to 350 parts by weight per 100 parts by weight of components (A) and (C) combined. With less than 30 parts of the acid, the progress of hydrolysis would be retarded and the agent in aqueous solution form would be less stable. Most preferably the acid catalyst is added in such an amount that when the reaction product is dissolved in water, the resulting aqueous system may be adjusted at pH 7.0 to 3.0.

Upon hydrolysis, the reactants are preferably diluted with a solvent. The solvents used herein are preferably alcohol solvents including methanol, ethanol, 1-propanol, 2-propanol, 1-butanol, 2-butanol, 3-butanol, and 2-methyl-2-butanol, with the 3-butanol being most preferred. The solvent is preferably used in an amount of about 100 to 500 parts by weight, more preferably about 200 to 400 parts by weight per 100 parts by weight of components (A) and (C) combined. Less than 100 parts of the solvent would allow condensation to take place whereas more than 500 parts of the solvent would undesirably retard hydrolysis.

For hydrolysis, water is preferably added to components (A) and (C) in an amount of about 1 to 3 mol, more preferably 1.2 to 2.5 mol per mol of components (A) and (C) combined. Less than 1 mol of water would leave much alkoxy groups whereas more than 3 mol of water would promote condensation. Preferred reaction conditions include a reaction temperature of 10° to 100° C., preferably 60° to 90° C. and a reaction time of about 1 to 3 hours.

The molar ratio of components (C) and (A) is preferably from 0.05:1 to 0.5:1. With a molar ratio of (C)/(A) of less than 0.05/1, durability would be low. With a molar ratio of (C)/(A) of more than 0.5/1, water solubility and/or oil repellency would be low.

The thus hydrolyzed product of components (A) and (C) is then successively reacted with component (B). The molar ratio of component (B) to components (A) and (C) combined is preferably from 0.5:1 to 20:1. With a molar ratio of (B)/(A C) of less than 0.5/1, water solubility would be low. With a molar ratio of (B)/(A+C) of more than 20/1, water repellency would be low. As to conditions for the reaction of component (B), a reaction temperature of 60 to 100° C. and a reaction time of about 1 to 3 hours are preferred.

The water-soluble surface treating agent of the invention is used by diluting with water such that the concentration of water may be 99.9 to 90% by weight, preferably 99 to 97% by weight. With a water concentration of more than 99.9% by weight, it would be difficult to take advantage of the reaction product and an excessively large amount of the dilution must be applied. A water concentration of less than 90% by weight would sometimes lead to shelf instability.

To the water-soluble surface treating agent of the invention, surfactants and well-known additives such as alcohols may be added for improving substrate wettability and aqueous solution stability insofar as the objects of the invention are not impaired. Metal base curing catalysts such as Al, Sn and Zn may also be added if desired.

The water-soluble surface treating agent of the invention is applied to substrates of glass, inorganic materials, ceramics, metals, and plastics for imparting thereto water repellent, oil repellent, moisture-proof, stain-proof, anti-icing, lubricant, mold release, weather resistant, and durable properties. The substrates can be treated with the agent by well-known techniques such as coating, dipping, and spraying. The agent will find use as water repellent agents, oil repellent agents, moisture-proof agents, anti-icing agents, anti-staining agents, lubricants, and mold release agents. More specifically, the agent is useful for the purposes of moisture-proof treatment of electronic parts, anti-staining surface treatment of optical lenses, moisture-proof, anti-staining, and lubricating surface treatment of optical and magnetic recording media, anti-staining surface treatment of liquid crystal displays and CRT displays, anti-staining and moisture-proof treatment of transparent plastic parts such as optical disc pickups, water-repellent and anti-icing surface treatment of glass and plastic glazing in automobiles, trains, aircraft, and helicopters, water-repellent and anti-staining surface treatment of building glazing, water-repellent and anti-icing surface treatment of radar antennas, TV antennas, and roofing, mold release treatment of molds for plastic molding, anti-staining treatment of electronic parts and precision equipment against lubricating oil, and water-repellent and lubricating wet treatment of oxides such as silica and titanium oxide.

EXAMPLE

Examples of the invention are given below by way of illustration and not by way of limitation.

Synthesis Example 1

A 1.0-liter four-necked flask equipped with a stirrer, condenser, thermometer, and dropping funnel was charged with 100 grams (0.176 mol) of $C_8F_{17}(CH_2)_2Si(OCH_3)_3$, 340 grams of 3-butanol, 26.3 grams (0.438 mol) of acetic acid, and 4.75 grams (0.264 mol) of water. With stirring, the flask was heated until 3-butanol refluxed. Reaction was continued for 2 hours in this condition. To the flask, 39.1 grams (0.176 mol) of $H_2N(CH_2)_2HN(CH_2)_3Si(OCH_3)_3$ was added dropwise. Reaction was continued for a further 1 hour under reflux of 3-butanol, obtaining a pale yellow clear liquid.

Synthesis Example 2

The procedure of Synthesis Example 1 was repeated except that 34.8 grams (0.58 mol) of acetic acid and 78.1 grams (0.352 mol) of $H_2N(CH_2)_2HN(CH_2)_3Si(OCH_3)_3$ were used. There was obtained a pale yellow clear liquid.

Synthesis Example 3

The procedure of Synthesis Example 1 was repeated except that methanol was used instead of the 3-butanol. Thereafter, the reaction solution was heated at 110° C. to distill off the methanol, obtaining a yellow white viscous product.

Synthesis Example 4

The procedure of Synthesis Example 2 was repeated except that methanol was used instead of the 3-butanol. Thereafter, the reaction solution was heated at 110° C. to distill off the methanol, obtaining a yellow white viscous product.

Synthesis Example 5

The procedure of Synthesis Example 1 was repeated except that 36.3 grams (0.176 mol) of $H_2N(CH_2)_2HN(CH_2)_3SiCH_3(OCH_3)_2$ was used instead of $H_2N(CH_2)_2HN(CH_2)_3Si(OCH_3)_3$. There was obtained a pale yellow clear liquid.

Synthesis Example 6

The procedure of Synthesis Example 1 was repeated except that 15.8 grams (0.264 mol) of acetic acid was used and 31.5 grams (0.176 mol) of $H_2N(CH_2)_3Si(OCH_3)_3$ was used instead of $H_2N(CH_2)_2HN(CH_2)_3Si(OCH_3)_3$. There was obtained a clear liquid.

Synthesis Example 7

The procedure of Synthesis Example 1 was repeated except that 107.5 grams (0.176 mol) of $C_8F_{17}CONH(CH_2)_2Si(OCH_3)_3$ was used instead of $C_8F_{17}(CH_2)_2Si(OCH_3)_3$. There was obtained a pale yellow clear liquid.

Synthesis Example 8

A 1.0-liter four-necked flask equipped with a stirrer, condenser, thermometer, and dropping funnel was charged with 129.2 grams (0.33 mol) of $C_{18}H_{37}SiCl_3$ and 200 grams of methylene chloride. With stirring, 89 grams (1.0 mol) of 2-dimethylaminoethanol diluted with 100 grams of methylene chloride was added dropwise to the flask from the dropping funnel. At the end of addition, 670 grams of 3-butanol was added to the contents, which were further stirred. The reaction solution was heated at 80° C. to distill off the methylene chloride. After cooling, 60 grams (1.0 mol) of acetic acid was added to the contents, which were stirred. Upon filtration, there was obtained a pale yellow clear liquid.

Synthesis Example 9

A 1.0-liter four-necked flask equipped with a stirrer, condenser, thermometer, and dropping funnel was charged with 100 grams (0.172 mol) of $C_8F_{17}C_2H_4SiCl_3$ and 152 grams of hexane. With stirring, 46 grams (0.516 mol) of 2-dimethylaminoethanol diluted with 23 grams of hexane was added dropwise to the flask from the dropping funnel. At the end of addition, the contents were stirred for 1 hour and 358 grams of 3-butanol was added to the contents, which were further stirred. The reaction solution was heated at 80° C. to distill off the hexane. After cooling, 32 grams (0.53 mol) of acetic acid was added to the contents, which were stirred. Upon filtration, there was obtained a pale yellow clear liquid.

Synthesis Example 10

A 1.0-liter four-necked flask equipped with a stirrer, condenser, thermometer, and dropping funnel was charged with 15 grams (0.026 mol) of $C_8F_{17}(CH_2)_2Si(OCH_3)_3$, 735 grams of 2-propanol, and 0.48 grams of 0.01N hydrochloric acid. With stirring, the flask was heated until 2-propanol refluxed. Reaction was continued for 2 hours in this condition, obtaining a clear liquid.

Example 1

A surface treating agent aqueous solution was prepared by diluting the reaction solution obtained in Synthesis Example 1 with water so that the concentration of its active component was 2% by weight. The solution was allowed to stand at room temperature for one month whereupon no change was observed.

Glass plates of 70 mm×150 mm×3 mm thick were dipped for 5 minutes in the solution both immediately after preparation and after aging at room temperature for one week. The treated glass plates were washed with water and heated at 100° C. for 15 minutes. These samples were examined for water repellency by measuring a contact angle with water. The results are shown in Table 1.

(a) Contact angle

A contact angle of a sample with water was measured. Measurement was done at five different points on the substrate surface. With maximum and minimum measurements cut off, an average of the remaining measurements was calculated.

(b) Boiling test

A sample was dipped in boiling water for 1 hour before its contact angle with water was measured by the same procedure as above.

Example 2

A surface treating agent aqueous solution was prepared by diluting the reaction solution obtained in Synthesis Example 2 with water so that the concentration of its active component was 2% by weight. The solution was allowed to stand at room temperature for one month whereupon no change was observed.

Glass plates of 70 mm×150 mm×3 mm thick were dipped for 5 minutes in the solution both immediately after preparation and after aging at room temperature for one week. The treated glass plates were washed with water and heated at 100° C. for 15 minutes. The test results of these samples are shown in Table 1.

Example 3

A surface treating agent aqueous solution was prepared by diluting 2 parts by weight of the reaction product obtained in Synthesis Example 3 with 98 parts by weight of water. The solution was allowed to stand at room temperature for one month whereupon no change was observed.

Glass plates of 70 mm×150 mm×3 mm thick were dipped for 5 minutes in the solution both immediately after preparation and after aging at room temperature for one week. The treated glass plates were washed with water and heated at 100° C. for 15 minutes. The test results of these samples are shown in Table 1.

Example 4

A surface treating agent aqueous solution was prepared by diluting 2 parts by weight of the reaction product obtained in Synthesis Example 4 with 98 parts by weight of water. The solution was allowed to stand at room temperature for one month whereupon no change was observed.

Glass plates of 70 mm×150 mm×3 mm thick were dipped for 5 minutes in the solution both immediately after preparation and after aging at room temperature for one week. The treated glass plates were washed with water and heated at 100° C. for 15 minutes. The test results of these samples are shown in Table 1.

Example 5

A surface treating agent aqueous solution was prepared by diluting the reaction solution obtained in Synthesis Example 5 with water so that the concentration of its active component was 2% by weight. The solution was allowed to stand at room temperature for one month whereupon no change was observed.

Glass plates of 70 mm×150 mm×3 mm thick were dipped for 5 minutes in the solution both immediately after preparation and after aging at room temperature for one week. The treated glass plates were washed with water and heated at 100° C. for 15 minutes. The test results of these samples are shown in Table 1.

Example 6

A surface treating agent aqueous solution was prepared by diluting the reaction solution obtained in Synthesis Example 6 with water so that the concentration of its active component was 2% by weight. The solution was allowed to stand at room temperature for one month whereupon no change was observed.

Glass plates of 70 mm×150 mm×3 mm thick were dipped for 5 minutes in the solution both immediately after preparation and after aging at room temperature for one week. The treated glass plates were washed with water and heated at 100° C. for 15 minutes. The test results of these samples are shown in Table 1.

Example 7

A surface treating agent aqueous solution was prepared by diluting the reaction solution obtained in Synthesis Example 7 with water so that the concentration of its active component was 2% by weight. The solution was allowed to stand at room temperature for one month whereupon no change was observed.

Glass plates of 70 mm×150 mm×3 mm thick were dipped for 5 minutes in the solution both immediately after preparation and after aging at room temperature for one week. The treated glass plates were washed with water and heated at 100° C. for 15 minutes. The test results of these samples are shown in Table 1.

Comparative Example 1

A surface treating agent aqueous solution was prepared by diluting the reaction solution obtained in Synthesis Example 8 with water so that the concentration of its active component was 2% by weight. The solution became white turbid after it was allowed to stand at room temperature for one day. A glass plate of 70 mm×150 mm×3 mm thick was dipped in the solution for 5 minutes, washed with water, and heated at 100° C. for 15 minutes. The test results of this sample are shown in Table 1.

Comparative Example 2

A surface treating agent aqueous solution was prepared by diluting the reaction solution obtained in Synthesis Example 9 with water so that the concentration of its active component was 2% by weight. The solution was white turbid immediately after preparation. A glass plate of 70 mm×150 mm×3 mm thick was dipped in the solution for 5 minutes, washed with water, and heated at 100° C. for 15 minutes. The test results of this sample are shown in Table 1.

Comparative Example 3

A surface treating agent aqueous solution was prepared by diluting the reaction solution obtained in Synthesis Example 10 with water so that the concentration of its active component was 2% by weight. A glass plate of 70 mm×150 mm×3 mm thick was dipped in the solution for 5 minutes, washed with water, and heated at 100° C. for 15 minutes. The test results of this sample are shown in Table 1.

TABLE 1

|  | Contact angle (°) | | Contact angle (°) after boiling test | |
| --- | --- | --- | --- | --- |
|  | Fresh | 7 days | Fresh | 7 days |
| Example 1 | 108 | 107 | 103 | 102 |
| Example 2 | 107 | 107 | 102 | 102 |
| Example 3 | 108 | 106 | 102 | 100 |
| Example 4 | 108 | 106 | 101 | 100 |
| Example 5 | 108 | 105 | 100 | 101 |
| Example 6 | 108 | 107 | 102 | 102 |
| Example 7 | 107 | 107 | 102 | 100 |
| CE 1 | 80 | inapplicable | 61 | inapplicable |
| CE 2 | 93 | 85 | 88 | 79 |
| CE 3 | 102 | 100 | 95 | 93 |

Synthesis Example 11

A 0.5-liter four-necked flask equipped with a stirrer, condenser, thermometer, and dropping funnel was charged with 48.8 grams (0.086 mol) of $C_8F_{17}(CH_2)_2Si(OCH_3)_3$, 1.2 grams (0.009 mol) of $(CH_3)_2Si(OCH_3)_2$, 169 grams of 3-butanol, 14.2 grams (0.237 mol) of acetic acid, and 2.6 grams (0.142 mol) of water. With stirring, the flask was heated until 3-butanol refluxed. Reaction was continued for 2 hours in this condition. To the flask, 21.0 grams (0.095 mol) of $H_2N(CH_2)_2HN(CH_2)_3Si(OCH_3)_3$ was added dropwise. Reaction was continued for a further 1 hour under reflux of 3-butanol, obtaining a pale yellow clear liquid.

Synthesis Example 12

A 0.5-liter four-necked flask equipped with a stirrer, condenser, thermometer, and dropping funnel was charged with 48.0 grams (0.085 mol) of $C_8F_{17}(CH_2)_2Si(OCH_3)_3$, 2.0 grams (0.017 mol) of $(CH_3)_2Si(OCH_3)_2$, 169 grams of 3-butanol, 15.1 grams (0.253 mol) of acetic acid, and 2.7 grams (0.152 mol) of water. With stirring, the flask was heated until 3-butanol refluxed. Reaction was continued for 2 hours in this condition. To the flask, 22.5 grams (0.101 mol) of $H_2N(CH_2)_2HN(CH_2)_3Si(OCH_3)_3$ was added dropwise. Reaction was continued for a further 1 hour under reflux of 3-butanol, obtaining a pale yellow clear liquid.

Synthesis Example 13

A 0.5-liter four-necked flask equipped with a stirrer, condenser, thermometer, and dropping funnel was charged with 48.8 grams (0.086 mol) of $C_8F_{17}(CH_2)_2Si(OCH_3)_3$, 1.2 grams (0.009 mol) of $(CH_3)_2Si(OCH_3)_2$, 169 grams of 3-butanol, 8.5 grams (0.142 mol) of acetic acid, and 2.6 grams (0.142 mol) of water. With stirring, the flask was heated until 3-butanol refluxed. Reaction was continued for 2 hours in this condition. To the flask, 16.9 grams (0.095 mol) of $H_2N(CH_2)_2HN(CH_2)_3Si(OCH_3)_3$ was added dropwise. Reaction was continued for a further 1 hour under reflux of 3-butanol, obtaining a clear liquid.

Synthesis Example 14

The procedure of Synthesis Example 11 was repeated except that 2.3 grams (0.009 mol) of $C_{10}H_{21}Si(OCH_3)_3$ was used instead of $(CH_3)_2Si(OCH_3)_2$. There was obtained a pale yellow clear liquid.

Synthesis Example 15

The procedure of Synthesis Example 11 was repeated except that 1.8 grams (0.009 mol) of $C_6H_{13}Si(OCH_3)_3$ was used instead of $(CH_3)_2Si(OCH_3)_2$. There was obtained a pale yellow clear liquid.

Synthesis Example 16

The procedure of Synthesis Example 11 was repeated except that 1.4 grams (0.009 mol) of $C_3H_7Si(OCH_3)_3$ was used instead of $(CH_3)_2Si(OCH_3)_2$. There was obtained a pale yellow clear liquid.

Synthesis Example 17

The procedure of Synthesis Example 11 was repeated except that 52.5 grams (0.086 mol) of $C_8F_{17}CONH(CH_2)_2Si(OCH_3)_3$ was used instead of $C_8F_{17}(CH_2)_2Si(OCH_3)_3$. There was obtained a pale yellow clear liquid.

Synthesis Example 18

The procedure of Synthesis Example 11 was repeated except that 8.6 grams (0.143 mol) of acetic acid was used and 17.0 grams (0.095 mol) of $H_2N(CH_2)_3Si(OCH_3)_3$ was used instead of $H_2N(CH_2)_2HN(CH_2)_3Si(OCH_3)_3$. There was obtained a clear liquid.

Example 8

A surface treating agent aqueous solution was prepared by diluting the reaction solution obtained in Synthesis Example 11 with water so that the concentration of its active component was 2% by weight. The solution was allowed to stand at room temperature for one month whereupon no change was observed.

Glass plates of 70 mm×150 mm×3 mm thick were dipped for 5 minutes in the solution both immediately after preparation and after aging at room temperature for one week. The treated glass plates were air dried at 25° C. for 24 hours and wiped with ethanol. These samples were examined for water repellency by measuring a contact angle with water. The results are shown in Table 2.

(a) Contact angle

A contact angle of a sample with water was measured. Measurement was done at five different points on the substrate surface. With maximum and minimum measurements cut off, an average of the remaining measurements was calculated.

(b) Boiling test

A sample was dipped in boiling water for 1 hour before its contact angle with water was measured by the same procedure as above.

(c) Wear test

Using a scratch abrasion tester (manufactured by KNT K.K.), a sample was subject to a fabric abrasion test under a load of 1 kg/cm² for 3,000 cycles. Its contact angle with water was then measured by the same procedure as above.

Example 9

A surface treating agent aqueous solution was prepared by diluting the reaction solution obtained in Synthesis Example 12 with water so that the concentration of its active component was 2% by weight. The solution was allowed to stand at room temperature for one month, with no change observed.

Glass plates of 70 mm×150 mm×3 mm thick were dipped for 5 minutes in the solution both immediately after preparation and after aging at room temperature for one week. The treated glass plates were air dried at 25° C. for 24 hours and wiped with ethanol. The test results of these samples are shown in Table 2.

Example 10

A surface treating agent aqueous solution was prepared by diluting the reaction solution obtained in Synthesis Example 13 with water so that the concentration of its active component was 2% by weight. The solution was allowed to stand at room temperature for one month, with no change observed.

Glass plates of 70 mm×150 mm×3 mm thick were dipped for 5 minutes in the solution both immediately after preparation and after aging at room temperature for one week. The treated glass plates were air dried at 25° C. for 24 hours and wiped with ethanol. The test results of these samples are shown in Table 2.

Example 11

A surface treating agent aqueous solution was prepared by diluting the reaction solution obtained in Synthesis Example 14 with water so that the concentration of its active component was 2% by weight. The solution was allowed to stand at room temperature for one month, with no change observed.

Glass plates of 70 mm×150 mm×3 mm thick were dipped for 5 minutes in the solution both immediately after preparation and after aging at room temperature for one week. The treated glass plates were air dried at 25° C. for 24 hours and wiped with ethanol. The test results of these samples are shown in Table 2.

Example 12

A surface treating agent aqueous solution was prepared by diluting the reaction solution obtained in Synthesis Example 15 with water so that the concentration of its active component was 2% by weight. The solution was allowed to stand at room temperature for one month, with no change observed.

Glass plates of 70 mm×150 mm×3 mm thick were dipped for 5 minutes in the solution both immediately after preparation and after aging at room temperature for one week. The treated glass plates were air dried at 25° C. for 24 hours and wiped with ethanol. The test results of these samples are shown in Table 2.

Example 13

A surface treating agent aqueous solution was prepared by diluting the reaction solution obtained in Synthesis Example 16 with water so that the concentration of its active component was 2% by weight. The solution was allowed to stand at room temperature for one month, with no change observed.

Glass plates of 70 mm×150 mm×3 mm thick were dipped for 5 minutes in the solution both immediately after preparation and after aging at room temperature for one week. The treated glass plates were air dried at 25° C. for 24 hours and wiped with ethanol. The test results of these samples are shown in Table 2.

Example 14

A surface treating agent aqueous solution was prepared by diluting the reaction solution obtained in Synthesis Example 17 with water so that the concentration of its active component was 2% by weight. The solution was allowed to stand at room temperature for one month, with no change observed.

Glass plates of 70 mm×150 mm×3 mm thick were dipped for 5 minutes in the solution both immediately after preparation and after aging at room temperature for one week. The treated glass plates were air dried at 25° C. for 24 hours and wiped with ethanol. The test results of these samples are shown in Table 2.

Example 15

A surface treating agent aqueous solution was prepared by diluting the reaction solution obtained in Synthesis Example 18 with water so that the concentration of its active component was 2% by weight. The solution was allowed to stand at room temperature for one month, with no change observed.

Glass plates of 70 mm×150 mm×3 mm thick were dipped for 5 minutes in the solution both immediately after preparation and after aging at room temperature for one week. The treated glass plates were air dried at 25° C. for 24 hours and wiped with ethanol. The test results of these samples are shown in Table 2.

Comparative Example 4

A surface treating agent aqueous solution was prepared by diluting the reaction solution obtained in Synthesis Example 8 with water so that the concentration of its active component was 2% by weight. The solution became white turbid after it was allowed to stand at room temperature for 1 day. A glass plate of 70 mm×150 mm×3 mm thick was dipped in the solution for 5 minutes, air dried at 25° C. for 24 hours and wiped with ethanol. The test results of this sample are shown in Table 2.

Comparative Example 5

A surface treating agent aqueous solution was prepared by diluting the reaction solution obtained in Synthesis Example 9 with water so that the concentration of its active component was 2% by weight. The solution was white turbid immediately after preparation. A glass plate of 70 mm×150 mm×3 mm thick was dipped in the solution for 5 minutes, air dried at 25° C. for 24 hours and wiped with ethanol. The test results of this sample are shown in Table 2.

Comparative Example 6

A surface treating agent aqueous solution was prepared by diluting the reaction solution obtained in Synthesis Example 10 with water so that the concentration of its active component was 2% by weight. A glass plate of 70 mm×150 mm×3 mm thick was dipped in the solution for 5 minutes, air dried at 25° C. for 24 hours and wiped with ethanol. The test results of this sample are shown in Table 2.

TABLE 2

|  | Contact angle (°) | | Contact angle (°) after boiling test | | Contact angle (°) after abrasion test | |
|---|---|---|---|---|---|---|
|  | Fresh | 7 days | Fresh | 7 days | Fresh | 7 days |
| Example 8 | 105 | 105 | 98 | 97 | 100 | 99 |
| Example 9 | 101 | 102 | 97 | 98 | 98 | 99 |
| Example 10 | 104 | 105 | 97 | 99 | 96 | 96 |
| Example 11 | 102 | 103 | 93 | 92 | 98 | 97 |
| Example 12 | 101 | 102 | 91 | 89 | 90 | 90 |
| Example 13 | 100 | 101 | 88 | 86 | 89 | 90 |
| Example 14 | 103 | 101 | 96 | 94 | 97 | 97 |
| Example 15 | 105 | 105 | 98 | 96 | 100 | 98 |
| CE 4 | 80 | <20 | 43 | <20 | 40 | <20 |
| CE 5 | 94 | 82 | 62 | 58 | 48 | 41 |
| CE 6 | 102 | 100 | 61 | 59 | 45 | 43 |

There has been described a water-soluble surface treating agent which has improved water solubility and shelf stability since water solubility is imparted to a fluoro-alkyl group-containing silane compound itself. An aqueous solution of the agent is applied to glass and other substrates to impart water repellency and other improved properties to the substrates while the improved properties imparted last long.

Japanese Patent Application Nos. 119304/1995 and 329860/1995 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A water-soluble surface treating agent comprising as a main ingredient a reaction product of (A) a fluoroalkyl group-containing alkoxysilane of the formula (1):

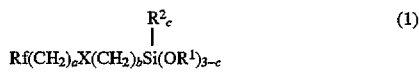

wherein Rf is $C_nF_{2n+1}$ or a polyfluoroalkyl group represented by

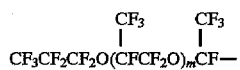

wherein n is an integer of 1 to 20 and m is an integer of at least 1,

X is at least one linkage group selected from the group consisting of $-CH_2-$, $-CH_2O-$, $-NR^3-$, $-CO_2-$, $-CONR^3-$, $-S-$, $-SO_3-$, and $-SO_2NR^3-$ wherein $R^3$ is a hydrogen atom or alkyl group of 1 to 8 carbon atoms, $R^1$ is an alkyl group having 1 to 4 carbon atoms, $R^2$ is an alkyl group having 1 to 4 carbon atoms, letter a is an integer of 0 to 3, b is an integer of 1 to 3, and c is equal to 0 or 1 and/or a partial hydrolyzate thereof and (B) an amino group-containing alkoxysilane of the formula (2):

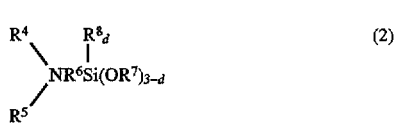

wherein $R^4$ and $R^5$ are independently selected from the class consisting of a hydrogen atom, alkyl group having 1 to 15 carbon atoms, and aminoalkyl group having 1 to 15 carbon atoms, $R^6$ is a divalent hydrocarbon group having 1 to 18 carbon atoms, $R^7$ is an alkyl group having 1 to 4 carbon atoms, $R^8$ is an alkyl group having 1 to 4 carbon atoms, and letter d is equal to 0 or 1 and/or a partial hydrolyzate thereof.

2. The agent of claim 1 wherein the reaction product is obtained by reacting components (B) and (A) in a molar ratio of from 0.5/1.0 to 20.0/1.0.

3. The agent of claim 1 comprising 0.1 to 10% by weight of the reaction product and 99.9 to 90% by weight of water.

4. A water-soluble surface treating agent comprising as a main ingredient a reaction product of (A) a fluoroalkyl group-containing alkoxysilane of the formula (1):

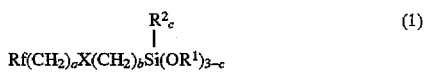

wherein Rf is $C_nF_{2n+1}$ or a polyfluoroalkyl group represented by

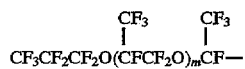

wherein n is an integer of 1 to 20 and m is an integer of at least 1,

X is at least one linkage group selected from the group consisting of $-CH_2-$, $-CH_2O-$, $-NR^3-$, $-CO_2-$, $-CONR^3-$, $-S-$, $-SO_3-$, and $-SO_2NR^3-$ wherein $R^3$ is a hydrogen atom or alkyl group of 1 to 8 carbon atoms, $R^1$ is an alkyl group having 1 to 4 carbon atoms, $R^2$ is an alkyl group having 1 to 4 carbon atoms, letter a is an integer of 0 to 3, b is an integer of 1 to 3, and c is equal to 0 or 1 and/or a partial hydrolyzate thereof, (B) an amino group-containing alkoxysilane of the formula (2):

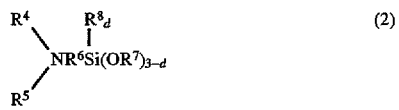

wherein $R^4$ and $R^5$ are independently selected from the group consisting of a hydrogen atom, alkyl group having 1 to 15 carbon atoms, and aminoalkyl group having 1 to 15 carbon atoms, $R^6$ is a divalent hydrocarbon group having 1 to 18 carbon atoms, $R^7$ is an alkyl group having 1 to 4 carbon atoms, $R^8$ is an alkyl group having 1 to 4 carbon atoms, and letter d is equal to 0 or 1 and/or a partial hydrolyzate thereof, and (C) an alkyl group-containing alkoxysilane of the formula (3):

$$R^9Si(OR^{11})_{3-e} \overset{R^{10}{}_e}{|} \quad (3)$$

wherein $R^9$ is a monovalent hydrocarbon group having 1 to 10 carbon atoms, $R^{10}$ is an alkyl group having 1 to 4 carbon atoms, $R^{11}$ is an alkyl group having 1 to 4 carbon atoms, and letter e is equal to 0 or 1 and/or a partial hydrolyzate thereof.

5. The agent of claim 4 wherein the reaction product is obtained by reacting components (A) and (C) in a molar ratio (C)/(A) of from 0.05/1 to 0.5/1 and further reacting them with component (B) in a molar ratio (B)/(A+C) of from 0.5/1 to 20/1.

6. The agent of claim 4 comprising 0.1 to 10% by weight of the reaction product and 99.9 to 90% by weight of water.

7. The agent of claim 1, wherein the fluoroalkyl group-containing alkoxysilane is selected from the group consisting of:

$C_8F_{17}C_2H_4Si(OCH_3)_3$,
$C_8F_{17}C_2H_4Si(OC_2H_5)_3$,
$C_8F_{17}CONHC_2H_4Si(OCH_3)_3$, and

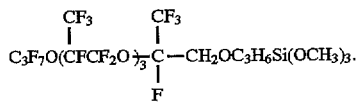

8. The agent of claim 1, wherein the amino group-containing alkoxysilane is selected from the group consisting of:

N-(2-aminoethyl)-3-amino-propyltrimethoxysilane,
N-(2-aminoethyl)-3-aminopropyl-methyldimethoxysilane, and
3-aminopropyltrimethoxysilane.

9. The agent of claim 1, wherein the reaction product is obtained by co-hydrolysis and condensation of (A) and (B) in the presence of an organic or inorganic acid.

10. The agent of claim 1, wherein the reaction product is obtained by effecting partial hydrolysis of (A) in the presence of an organic or inorganic acid and then reacting the obtained partial hydrolysis product with (B).

11. The agent of claim 10, wherein the organic or inorganic acid is hydrochloric, sulfuric, methanesulfonic, formic, acetic, propionic, citric, oxalic or maleic acid or a mixture thereof.

12. The agent of claim 10, wherein the organic or inorganic acid is used in an amount of 5 to 400 parts by weight per 100 parts by weight of (A).

13. The agent of claim 10, wherein the partial hydrolysis is effected in an amount of 1.0 to 3.0 mol of water per mol of (A).

14. The agent of claim 10, wherein the partial hydrolysis is conducted at 10° to 100° C. for about 1 to 3 hours.

15. The agent of claim 10, wherein the reaction oft he partial hydrolysis product with (B) is conducted at 60° to 100° C. for about 1 to 3 hours.

16. The agent of claim 4, wherein the fluoroalkyl group-containing alkoxysilane is selected from the group consisting of:

$C_8F_{17}C_2H_4Si(OCH_3)_3$,
$C_8F_{17}C_2H_4Si(OC_2H_5)_3$,
$C_8F_{17}CONHC_2H_4Si(OCH_3)_3$, and

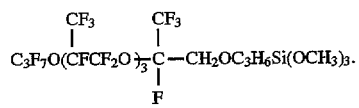

17. The agent of claim 4, wherein the amino group-containing alkoxysilane is selected from the group consisting of:

N-(2-aminoethyl)-3-amino-propyltrimethoxysilane,
N-(2-aminoethyl)-3-aminopropyl-methyldimethoxysilane, and
3-aminopropyltrimethoxysilane.

18. The agent of claim 4, wherein the alkyl group-containing alkoxysilane is selected from the group consisting of:

$C_{10}H_{21}Si(OCH_3)_3$, $C_{10}H_{21}Si(CH_3)(OCH_3)_2$, $(CH_3)_2Si(OCH_3)_2$, and $(CH_3)_2Si(OC_2H_5)_2$.

19. The agent of claim 4, wherein the reaction product is obtained by effecting partial hydrolysis of (A) and (C) in the presence of an organic or inorganic acid and then reacting the obtained partial hydrolysis product with (B).

20. The agent of claim 19, wherein the organic or inorganic acid is hydrochloric, sulfuric, methanesulfonic, formic, acetic, propionic, citric, oxalic or maleic acid or a mixture thereof.

21. The agent of claim 19, wherein the organic or inorganic acid is used in an amount of 30 to 400 parts by weight per 100 parts by weight of (A) and (C) combined.

22. The agent of claim 19, wherein the partial hydrolysis is effected in an amount of 1.0 to 3.0 mol of water per mol of (A) and (C) combined.

23. The agent of claim 19, wherein the partial hydrolysis is conducted at 10° to 100° C. for about 1 to 3 hours.

24. The agent of claim 19, wherein the reaction of the partial hydrolysis product with (B) is conducted at 60° to 100° C. for about 1 to 3 hours.

* * * * *